US009778057B2

(12) United States Patent
O'Mahony et al.

(10) Patent No.: US 9,778,057 B2
(45) Date of Patent: Oct. 3, 2017

(54) SELECTING A ROUTE TO A DESTINATION BASED ON ZONES

(71) Applicant: Uber Technologies, Inc., San Francisco, CA (US)

(72) Inventors: Eoin O'Mahony, San Francisco, CA (US); John Mark Nickels, San Francisco, CA (US); Brent Goldman, San Francisco, CA (US); Jeff Holden, San Francisco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 0 days.

(21) Appl. No.: 15/018,042

(22) Filed: Feb. 8, 2016

(65) Prior Publication Data
US 2017/0227371 A1 Aug. 10, 2017

(51) Int. Cl.
*G01C 21/36* (2006.01)

(52) U.S. Cl.
CPC .................................. *G01C 21/36* (2013.01)

(58) Field of Classification Search
CPC .... G01C 21/36; G01C 21/3415; G01C 21/26; G08G 1/0112; G08G 1/0969; G08G 21/202; G08G 1/087; G08G 1/163; G06Q 10/1095; G06Q 50/30; G06Q 10/06313; B60W 50/14; B61L 27/0016
See application file for complete search history.

(56) References Cited

U.S. PATENT DOCUMENTS

| 5,274,387 | A | * | 12/1993 | Kakihara | G08G 1/0969 |
| | | | | | 342/451 |
| 6,321,158 | B1 | * | 11/2001 | DeLorme | G01C 21/26 |
| | | | | | 340/995.16 |
| 6,950,745 | B2 | | 9/2005 | Agnew et al. | |
| 6,989,765 | B2 | | 1/2006 | Gueziec | |
| 7,610,145 | B2 | | 10/2009 | Kantarjiev et al. | |
| 8,362,894 | B2 | | 1/2013 | Shah | |
| 8,972,159 | B2 | * | 3/2015 | Ferreira | G08G 1/163 |
| | | | | | 701/117 |

(Continued)

FOREIGN PATENT DOCUMENTS

KR 10-2012-0090445 A 8/2012

OTHER PUBLICATIONS

PCT International Search Report and Written Opinion, PCT Application No. PCT/IB2016/058128, Apr. 14, 2017, 13 pages.

*Primary Examiner* — Yuri Kan
(74) *Attorney, Agent, or Firm* — Fenwick & West LLP (57) ABSTRACT

A travel coordination system provides suggestions to providers for where they should go to reduce the wait time between trips. A geographic region is broken down into zones and a score is generated for each zone. A zone score can be generated by determining the estimated wait time for the zone and generating a model for the wait time. A zone score can also be generated using a model for the wait time using factors that likely contribute to the wait time. The zone score for each zone is displayed to the provider on a road map of the geographic region along with the boundaries of each of the zones and the provider's position within the region. The travel coordination system also suggests driving routes. The travel coordination system selects a target zone and generates candidate routes to the zone. A route is selected based on route scores.

20 Claims, 7 Drawing Sheets

(56) References Cited

U.S. PATENT DOCUMENTS

| | | |
|---|---|---|
| 9,424,515 B2 | 8/2016 | Atlas |
| 2003/0163253 A1* | 8/2003 | Lee .................... G01C 21/3415 |
| | | 701/446 |
| 2008/0114629 A1 | 5/2008 | Pavlov |
| 2011/0144904 A1 | 6/2011 | Pinkus et al. |
| 2012/0226391 A1 | 9/2012 | Fryer et al. |
| 2013/0116916 A1* | 5/2013 | Kickbusch .......... B61L 27/0016 |
| | | 701/118 |
| 2014/0278029 A1* | 9/2014 | Tonguz .................. G08G 1/087 |
| | | 701/117 |
| 2015/0356703 A1 | 12/2015 | Ellis et al. |
| 2016/0209220 A1* | 7/2016 | Laetz ...................... G08G 1/202 |
| 2016/0223343 A1* | 8/2016 | Averbuch .............. B60W 50/14 |
| 2016/0225255 A1* | 8/2016 | Thakur ................ G08G 1/0112 |
| 2016/0247106 A1* | 8/2016 | Dalloro ............ G06Q 10/06313 |
| 2016/0364678 A1* | 12/2016 | Cao ........................ G06Q 50/30 |
| 2016/0364679 A1* | 12/2016 | Cao ........................ G06Q 50/30 |
| 2016/0364812 A1* | 12/2016 | Cao ........................ G06Q 50/30 |
| 2016/0364823 A1* | 12/2016 | Cao .................... G06Q 10/1095 |

\* cited by examiner

SELECTING A ROUTE TO A DESTINATION BASED ON ZONES

BACKGROUND

This disclosure relates generally to travel coordination systems.

Travel coordination systems provide a means of travel by connecting people who need rides (i.e., "riders") with drivers (i.e., "providers"). A rider can submit a request for a ride to the travel coordination system and the travel coordination system selects a provider to service the request by transporting the rider to their intended destination.

Travel coordination systems may allow providers to determine on their own how to best position themselves to service as many riders as possible. However, this method is ineffective, as providers may not effectively position themselves or will merely stay wherever the last ride finished. Therefore, providers may experience extended wait times between trips, making them and the overall travel coordination system less efficient.

SUMMARY

A travel coordination system provides information to providers to reduce the wait time between trips. A geographic region, such as a city, neighborhood, or county, etc., is separated into zones and a score is generated for each zone by the travel coordination system. The zone score represents an estimated wait time for a provider in the zone before receiving an invitation to provide a service for a rider. In other words, the zone score may reflect the expected time until the next ride for the provider. The score for a particular zone is determined using data collected from the zone. In some embodiments, the zone data is supplemented by data from a data collection area surrounding the zone. This may be used when the zone does not have enough data to generate an accurate score and to smooth the resulting data across various zones.

In some embodiments, a zone score is generated by determining the estimated wait time for the zone at a given point in time by applying a wait time model. The wait time model can be used to generate zone scores for a current time or points in time occurring in the future. In some embodiments, the wait time model estimates wait time at a given time by computing the wait time that prior providers spent in the zone without being assigned to a rider. The wait time for prior providers in a zone may be used to train the model to predict wait times in the future based on various factors, such as the time of day, day of the week, the current wait time for the zone, etc., and/or based on the vehicle types or service options of the providers. In some embodiments, the travel coordination system determines the proportion of open providers in the zone who receive an assignment request within a time period and uses the proportion to determine the likelihood that a provider will receive an assignment request. This likelihood is used to estimate the wait time in the zone.

In some embodiments, a zone score is generated using a model for the wait time using factors that are likely contribute to the wait time. These factors can reflect the supply of providers (e.g., the number of providers in a zone or the rate at which the providers go online/offline) or the demand for providers (e.g., the current assignment request rate or a number of riders who have opened or are using a specified client application). In some embodiments, the score for a zone is dependent on the behavior of various providers, such as how likely individual providers are to drive to that zone and how often the provider is in the zone. This behavior may reflect, for example, existing trips that will complete within the zone, providers becoming available to provide rides, providers becoming unavailable to provide rides, and other indications that individual providers will become (or no will longer be) available in the zone.

In some embodiments, zone scores are generated for different points in time. For example, zone score can be generated for the current time, for five minutes in the future, or for the time at which a provider is expected to arrive at the zone. The zone scores can be determined in real time, or pre-generated and cached based on the times for which they were computed.

The zone score for each zone is displayed to the provider. In some embodiments, the zone scores are displayed on a road map of the geographic region along with the boundaries of each of the zones and the provider's position within the region. In some embodiments, the zone scores are represented using a heat map, wherein each zone is displayed in a color or shade based on its respective zone score.

In some embodiments, the travel coordination system suggests driving routes to a provider based on the zone scores. The travel coordination system identifies a destination for the provider to travel to and generates candidate routes from the provider's position to the destination. Each of the candidate routes is scored and one is selected based on the route scores. The scores can be generated based on the scores of the zones through which the route passes, the estimated amount of time a provider would spend in each zone through which the route passes, the travel time to the destination, or the zone score for the zone containing the destination. In some embodiments, the travel coordination system uses a weighted average or an integral of the zone scores along a route to determine a score for the route. The travel coordination system selects a route from the candidate routes and transmits the route to the provider. In some embodiments, the travel coordination system selects the route with the highest score. In this way, the travel coordination system can recommend a route to the target zone along which a provider is more likely to receive a ride request, such that the provider has a higher likelihood of servicing a ride before arriving at the target zone and to reduce the time before a provider receives a ride request.

DETAILED DESCRIPTION

Overview

Figure 1:
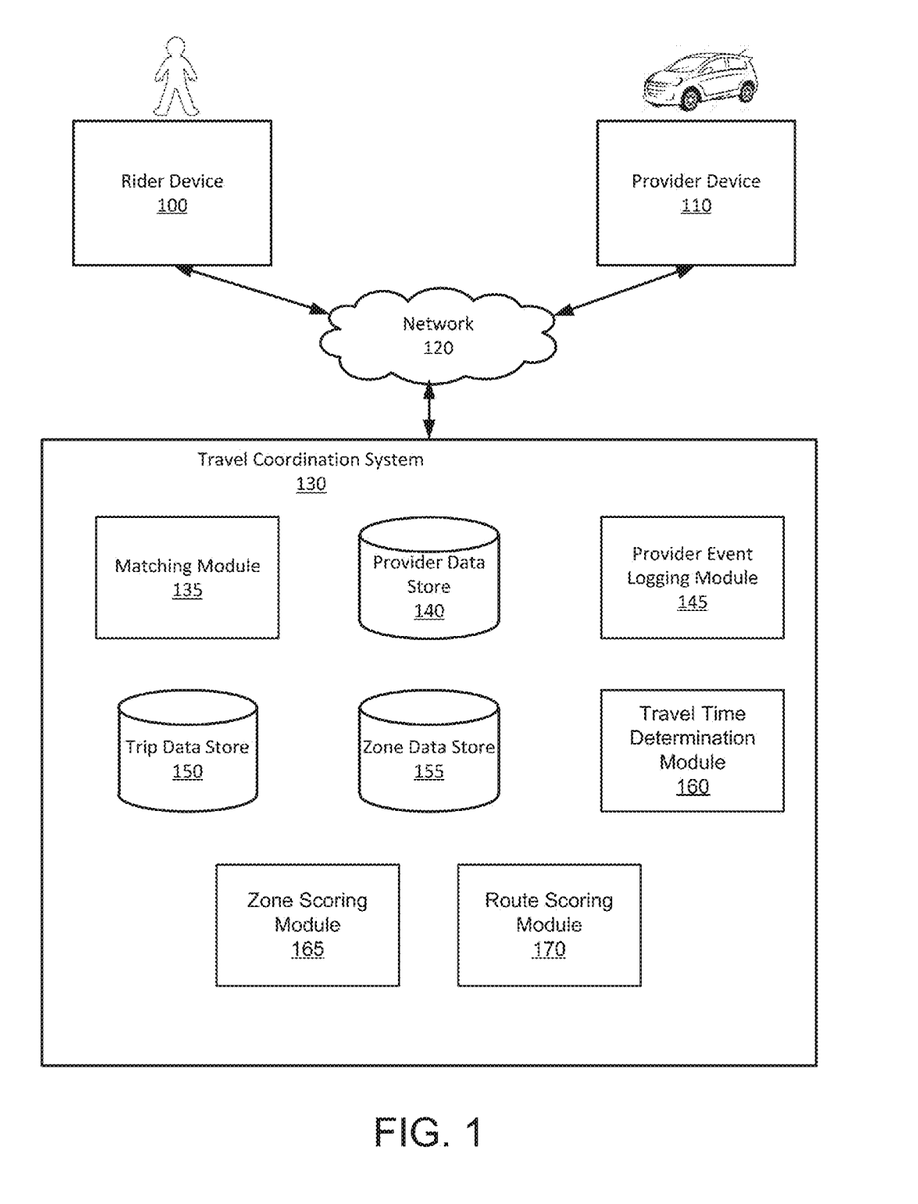
FIG. 1 is illustrates a system environment and architecture for a travel coordination system, in accordance with some embodiments.

FIG. 1 illustrates a system environment and architecture for a travel coordination system 130, in accordance with some embodiments. The illustrated system environment includes a rider device 100, a provider device 110, a network 120, and a travel coordination system 130. In alternative configurations, different and/or additional components may be included in the system environment. The travel coordination system 130 provides travel coordination services between a number of riders each operating a rider device 100 and a number of providers each operating a provider device 110 in a given region.

By using the rider device 100, the rider can interact with the travel coordination system 130 to request a transportation service from a current location (or specified pickup location) to a destination location. While examples described herein relate to a transportation service, the travel coordination system 130 can enable other services to be requested by requesters, such as a delivery service, food service, entertainment service, etc., in which a provider is to travel to a particular location. A rider can make a trip request to the travel coordination system 130 to request a trip by operating the rider device 100. As described herein, a rider device 100 and/or a provider device 110 can be a personal or mobile computing device, such as a smartphone, a tablet, or a computer. In some embodiments, the personal computing device executes a client application that uses an application programming interface (API) to communicate with the travel coordination system 130 through the network(s) 120. According to an example, a trip request can contain rider identification information, the number of passengers for the trip, a requested type of the provider (e.g., a vehicle type or service option identifier), the current location and/or the pickup location (e.g., a user-specific location, or a current location of the rider determined using a geo-aware resource of the rider device 100), and/or the destination for the trip.

The provider can interact with, via the provider device 110, the travel coordination system 130 to connect with riders to whom the provider can provide transportation. In some embodiments, the provider is a person driving a car, bicycle, bus, truck, boat, or other motorized vehicle capable of transporting passengers. In some embodiments, the provider is an autonomous vehicle that receives routing instructions from the travel coordination system 130. For convenience, this disclosure generally uses a car with a driver as an example provider. However, the embodiments described herein may be adapted for these alternative providers.

A provider device 110 receives, from the travel coordination system 130, assignment requests to be assigned to transport a rider who submitted a trip request to the travel coordination system 130. For example, the travel coordination system 130 can receive a trip request from a rider device 100, select a provider from a pool of available (or open) providers to provide the trip, and transmit an invitation message to the selected provider's device 110. In some embodiments, a provider can decide to start receiving assignment requests by going online (e.g., launching a provider application and/or providing input on the provider application to indicate that the provider wants to receive invitations), and stop receiving assignment requests by going offline. In some embodiments, when a provider device 110 receives an assignment request, the provider has the option of accepting or rejecting the assignment request. By accepting the assignment request, the provider is assigned to the rider, and is provided the rider's pickup location and trip destination. In one example, the rider's pickup location and/or destination location is provided to the provider device 110 as part of the invitation or assignment request.

In some embodiments, the provider device 110 interacts with the travel coordination system 130 through a designated client application configured to interact with the travel coordination system 130. The client application of the provider device 110 can present information, received from the travel coordination system 130, on a user interface, such as a map of the geographic region, the current location of the provider device 110, an assignment request, the pickup location for a rider, a route from a pickup location to a destination, current traffic conditions, and/or the estimated duration of the trip. According to some examples, each of the rider device 100 and the provider device 110 can include a geo-aware resource, such as a global positioning system (GPS) receiver, that can determine the current location of the respective device (e.g., a GPS point). Each client application running on the rider device 100 and the provider device 110 can determine the current location and provide the current location to the travel coordination system 130.

In some embodiments, the client application presents zone scores to a provider through the provider device 110, allowing the provider to select a zone to reduce the wait time for an assignment request. The zone scores can be presented as an overlay on a map (or map tiles) with the boundaries and scores of the zones. In one example, the client application only displays the zone scores for zones near the current location of the provider. As an addition or an alternative, the client application presents a route to a destination that uses the zone scoring to improve the likelihood that a provider receives an assignment request while traveling to the destination and reduce the wait time before the provider device receives an assignment request.

The rider device 100 and provider device 110 communicate with the travel coordination system 130 via the network 120, which may comprise any combination of local area and wide area networks employing wired or wireless communication links. In one embodiment, the network 120 uses standard communications technologies and protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any format, such as hypertext markup language (HTML) or extensible markup language (XML). In some embodiments, all or some of the communication links of the network 120 may be encrypted.

The travel coordination system 130 comprises a matching module 135, a provider data store 140, a provider event logging module 145, a trip data store 150, a zone creation module 155, a travel time determination module 160, a zone scoring module 165, and a route scoring module 170. In alternative configurations, different and/or additional components may be included in the system architecture. Conventional components such as web servers, network interfaces, security functions, load balancers, failover servers, management and network operations consoles, and the like are not shown so as to not obscure the details of the system architecture.

The matching module 135 selects a provider to service the trip request of a rider. The matching module 135 receives a trip request from a rider through the rider device 100 and determines a set of candidate providers that are online, open (i.e., are available to transport a rider), and near the requested pickup location for the rider. The matching module 135 selects a provider from the set of candidate providers to which it transmits an assignment request. The provider can be selected based on the provider's location, the rider's pickup location, the type of the provider, the amount of time the provider has been waiting for an assignment request and/or the destination of the trip, among other factors. In some embodiments, the matching module 135 selects the provider who is closest to the pickup location or would take the least amount of time to travel to the pickup location. The matching module 135 sends an assignment request to the selected provider. In some embodiments, the provider device 110 always accepts the assignment request and the provider is assigned to the rider. In some embodiments, the matching module 135 awaits a response from the provider device 110 indicating whether the provider accepts the assignment request. If the provider accepts the assignment request, then the matching module 135 assigns the provider to the rider. If the provider rejects the assignment request, then the matching module 135 selects a new provider and sends an assignment request to the provider device 110 for that provider. In some embodiments, rather than requesting confirmation from the provider device 110, the travel coordination system 130 assigns the selected provider to the rider without express confirmation from the provider device 110.

The provider data store 140 stores information about providers (e.g., state or status information of providers or associated client applications). For example, the provider data store 140 can store whether the provider is online or offline, whether the provider is open or has been assigned to a rider 100, the current location of the provider via the provider device 110, and the number of passengers a provider can transport. In some embodiments, the provider data store 140 determines and stores information about a provider's behavior, such as when the provider tends to be online/offline, where the provider tends to drive, and how likely the driver is to follow a suggestion for a zone or route. In some embodiments, the provider data store 140 stores a type for each provider. For example, providers may be typed based on the number of passengers they can transport, the type of vehicle the provider is driving, or whether the provider is driving what is considered to be "luxury" vehicle. In some embodiments, the provider data store 140 stores provider information in profiles for each provider.

The provider event logging module 145 logs information about events relating to a provider to the provider data store 140. For example, the provider event logging module 145 may log a provider going online, going offline, being assigned to a rider, becoming open (i.e., available for assignment), or entering a zone. In some embodiments, the provider event logging module 145 logs the time and location of each event. In some embodiments, each logged event is associated with a provider profile in the profile data store 140.

The trip data store 150 stores information about trips provided through the travel coordination system 130. For example, the trip data store can store the start and end locations of a trip, the start and end times of a trip, identification information of the provider or rider, the duration and distance of a trip, the number of passengers on the trip, the time at which the rider requested the trip, or the route taken by the provider. In some embodiments, the trip data store 150 associates each trip with a provider profile in the provider data store 140 for the provider associated with the trip.

The zone data store 155 stores information about a geographic region. The geographic region can be a city, neighborhood, county, or any other area in which a provider may travel. The region is partitioned into zones that represent the portions of the geographic region used by the travel coordination system 130 for collecting data about the region, and each zone may be the smallest portion of the region about which information is gathered. In one embodiment, each zone is a hexagonal section of the region or in other embodiments may be any other tessellating shape or repeating-size-and-shape portion of the map. In further embodiments, each zone may overlap with one another. For example, the zones may represent geometric shapes that overlap with one another, such as circular boundaries with a given radius and with centers separated by less than the diameter of each circle. The data collected for a zone is stored in the zone data store 155. The zone data store 155 can store boundary information for the zone, the number of providers in a zone, estimate the rate of travel through the zone, traffic conditions in the zone, current trips that have started in the zone, and/or current trips that will be ending in the zone. The zone data store 155 can also store zone scores representing the estimated amount of time a provider would have to wait in a zone before they receive an assignment request. In some embodiments, the zone data store 155 stores historical information about a zone.

The travel time determination module 160 estimates the time it would take for a provider to travel from one location to another. For example, the travel time determination module 160 may determine the time it would take for a provider to travel to pick up a rider, the travel time for a trip, and/or the travel time the provider's current location to a particular zone. The travel time determination module 160 uses map data, a routing engine, and/or data stored by the travel coordination system 130 to determine a route and/or the travel time of a route from the current location to a particular destination. To determine the travel time, the travel time determination module 160 uses data that may include the current location of the provider, the destination, the route to the location, the current time, and/or current or future traffic conditions along the route to the location. In some embodiments, the travel time determination module 160 generates a set of candidate routes from the provider's current location to the destination, determines the travel time for each route, and identifies the fastest route to the destination. In some embodiments, the travel time determination module 160 estimates the duration of a trip that begins at a future start time. For example, if a provider will pick up a rider in 15 minutes, the travel time determination module 160 may determine the duration of the trip starting from when the provider will pick up the rider, rather than the current time. In some embodiments, the travel time determination module 160 determines an arrival time at a location based on the travel time.

The zone scoring module 165 generates a score for each zone that represents an estimate for how long a provider would have to wait to receive an assignment request in that zone. In this disclosure, a higher score is a better score (i.e., lower estimated wait time for an assignment request) and a lower score is a worse score (i.e., higher wait time). However, in other configurations a lower score is a better score and a higher score is a worse score. The zone scoring module 165 can generate zone scores for the current state of the zone or for the state of the zone at a future time. In some embodiments, the zone scoring module 165 generates a score for the zone for the time when the provider would arrive at the zone. For example, if the travel time determination module 160 determines a provider is 15 minutes away from a zone, then the zone scoring module 165 evaluates the zone score for that zone with respect to 15 minutes from the current time (i.e., when the provider would actually arrive at that zone). In some embodiments, the zone scoring module 165 caches zone scores in the zone data store 155 based on the time for which they were generated.

A zone score can be generated by determining the estimated wait time in real time. In some embodiments, the estimated wait time is determined by computing the wait time of providers who became available for an assignment request within a zone and received an assignment request while within the same zone. Various methods for determining the estimated wait time are further discussed below.

In some embodiments, the zone scoring module 165 estimates the wait time in a zone by determining the likelihood that a provider will receive an assignment request within a time period. The zone scoring module 165 identifies, at a first time point, the set of providers in the zone that are available to receive an assignment request. At a second point in time, the zone scoring module 165 determines the proportion of the set of available providers that received an assignment request between the first and second point in time. Using the proportion of available providers who received an assignment request in the time period between the first and second points in time, the zone scoring module 165 determines the likelihood that a provider in the zone will receive an assignment request during the period of time. The likelihood of receiving an assignment request is used to estimate the wait time in the zone, for example by extrapolating the likelihood of receiving an assignment request within the time period to an average, or mean, time to receive an assignment request.

In some embodiments, the zone scoring module 165 generates a model for the wait time using the estimated wait times determined over time, and uses those models to predict the wait time when generating zone scores for future points in time. This modeling, for example, may use the likelihood of receiving an assignment request based on the proportion of providers receiving a request, or may use the actual wait time of providers in the zone as previously indicated.

In some embodiments, the zone scoring module 165 generates a model of the wait time based on underlying factors relating to the supply and demand of providers in a zone. The supply of providers represents the number of open providers in the zone and the demand of providers represents the number of riders submitting trip requests in the zone. The zone scoring module 165 may consider provider supply factors such as the number of providers in the zone, rate at which providers are coming online/going offline, the rate at which providers are being assigned to riders, the rate at which providers are finishing trips in the zone, the rate at which providers are traveling into and out of the zone, and the historical supply of providers in the zone. The zone scoring module 165 may also consider provider demand factors such as the trip request rate, the assignment request rate, and the historical demand for rides in the zone. In some embodiments, the zone scoring module 165 generates a model of the provider supply and provider demand in a zone to determine a zone score for future points in time. In some embodiments, the supply and demand factors are weighted using weights that are determined through a machine learning process.

In some embodiments, the zone scoring module 165 uses an exponential distribution to model the wait time. For example, the zone scoring module 165 may use an exponential distribution to represent the distribution of wait times for providers within a zone. In some embodiments, a gamma distribution is used to model the wait time of a provider within a zone. The zone scoring module 165 can generate different zone scores for each provider. The scores for each provider may reflect different conditions with respect to the supply and demand of providers for a zone (i.e., as providers are known to be traveling to or from a zone) and the likelihood that providers will travel to a given location (i.e., a provider is more likely to travel towards a zone near the provider's home). For example, the zone scoring module 165 may generate a higher zone score for one provider than for another to better balance the supply of providers given that the first provider may already be traveling to the zone. If every provider is shown the same zone scores, then providers may flock to zones with a high zone scores and away from zones with low zone scores, which might leave some zones over-serviced and under-serviced respectively. In some embodiments, the zone scoring module 165 adjusts a zone score based on the behavior of the provider. In another example, if a provider is not particularly likely to travel to a zone with a high zone score, the zone scoring module 165 may increase or decrease the zone score to further encourage (or discourage) the provider to travel to the zone. The zone scoring module 165 may also adjust a zone score based on whether the provider has shown a preference for a particular zone or zones.

Thus, a zone score may be calculated as each provider requests a score for each zone, and the zone scoring module 165 may access the existing trips for a zone to determine which providers are headed to each zone. As an example, as a provider is provided zone scores through a provider device 110, that provider may indicate that the provider will travel to a particular zone, or otherwise be likely to travel to zone with a higher score. When determining the zone score for the next provider, the zone scoring module 165 may provide a reduced zone score to the next provider for the zone to which the former provider is headed reflect the increased supply attributable to the former provider headed to that zone.

The route scoring module 170 determines a route from the current location of the provider to a destination. The route scoring module 170 selects a route that reduces the wait time of a provider for an assignment request, given the different available routes to reach a destination. The route scoring module 170 can reduce the wait time of the provider by increasing the likelihood that the provider receives an assignment request along each candidate route by, for example, routing the provider through a candidate route having zones with high zone scores. The route scoring module 170 can also reduce the wait time of the provider by providing a route that quickly takes the provider to the destination when the destination is in a zone with a high zone score relative to the zones traveled by other candidate routes. For example, when a stadium or other event causes a zone to have a very high zone score relative to surrounding zones.

In some embodiments, the destination is specified by the provider and the route scoring module 170 provides a route to the destination to the provider having the highest route score. The route score reflects the average time-to-assignment-request along the route. Thus, the route score reflects the likelihood that a provider receives an assignment request along various portions of the route, which may include the time that a route reaches the destination ahead of other routes. In other embodiments, the travel coordination system 130 selects a target zone and provides a route to the provider to a destination within the target zone. The destination can be anywhere within the zone, including the center of the zone or a point on the boundaries of the zone. In some embodiments, the target zone is selected based on the zone score for the target zone and the travel time to the target zone, for example to automatically suggest a zone as described above. The route scoring module 170 generates a set of candidate routes from the provider's current position to the destination. In some embodiments, the candidate routes are filtered by criteria to be included in the set. For example, candidate routes that arrive at the destination later than a maximum time relative to the fastest route are excluded in some embodiments.

The route scoring module 170 generates a route score for each of the candidate routes. A route score is determined based on the estimated wait time of a provider taking the route. The route score may be generated based on the zone score of the target zone, the travel time of the route, the zone scores of the zones through which the route passes, and the estimated amount of time the provider would spend in each zone while traveling along the route.

In some embodiments, the route scoring module 170 determines the likelihood that the provider will receive an assignment request while traveling along the route. In some embodiments, the route scoring module 170 determines the likelihood of assignment by identifying the zones through which the route passes. Using the identified zones, the route scoring module 170 determines how long the provider is expected to be in the zones and likelihood of receiving ride from a zone by traveling along the route and for each zone determining the product of the time spent in the zone and the zone score of the zone. The products are combined (e.g. summed) and used to determine an overall likelihood that the provider will receive an assignment request while traveling along the route. In some embodiments, the likelihood is determined by taking the integral with respect to time of the zone scores of the zones through which the route passes. The route scoring module 170 can also find the likelihood by taking a weighted average of the zone scores of the zones through which the route passes, weighted according to the length of time that the provider is expected to spend in each zone when traveling that route. In some embodiments, the zone scores for the zones through which a route passes are determined for the time at which the provider will pass through the zone. For example, if the provider is expected to reach a zone 10 minutes into a trip along the route, the route scoring module 170 will use a zone score for the zone for 10 minutes in the future. In some embodiments, the route score is determined based on where along a candidate route a provider is likely to receive an assignment request. For example, one candidate route may receive a higher route score than another because the former candidate route begins by passing through zones with high zone scores and the latter candidate route passes through zones with high zone scores later in the trip. A provider may receive an assignment request earlier along the former candidate route than the latter candidate route and, therefore, the former candidate route may receiver a higher route score.

In some embodiments, a route score is determined based on the travel time of a route. If the destination is in a zone with a high zone score, then the route scoring module 170 may generate a higher score for a route that reduces the travel time of the provider to the destination. In some embodiments, the route score for one route is determined based on the travel times of the other candidate routes. In these embodiments, the route scoring module 170 may generate a higher route score for a route based on the difference in the travel times of the routes and the estimated wait time in the zone containing the destination. For example, if a first route has a travel time of 20 minutes and a second route has a travel time of 30 minutes, the route scoring module 170 may provide a higher route score to the first route than to the second route, since the first route takes 10 fewer minutes to arrive at the destination. This would mean that the provider would be able to spend 10 extra minutes in the zone that contains the destination, which may reduce the overall wait time of the provider for an assignment request.

The route scoring module 170 selects a route from the set of candidate routes based on the route scores of the candidate routes and the selected route is transmitted to the provider device 110 for the provider. In some embodiments, the selected route is presented to the provider through the provider device 110 as a suggested route to either a destination specified by the provider or to a target zone selected by the travel coordination system 130. In some embodiments, the route scoring module 170 reevaluates route scores during travel of the provider to the destination, and if another route has a better route score, the route scoring module 170 will present the new route to the provider.

Generating Zone Scores

Figure 2:
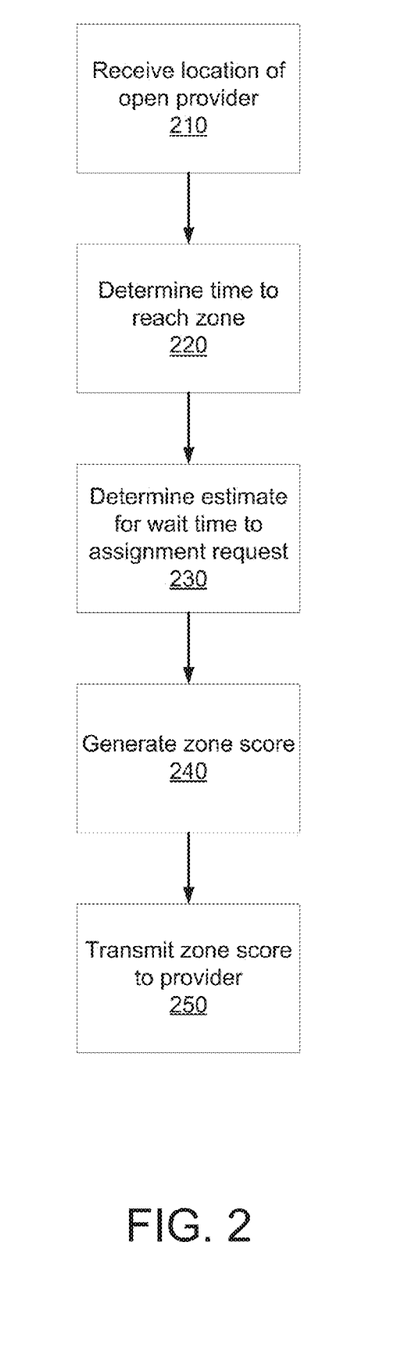
FIG. 2 is a flowchart for generating zone scores to present to a provider, in accordance with some embodiments.

FIG. 2 is a flowchart for generating a zone score to present to a provider, in accordance with some embodiments. This generation of a zone score may be performed by the various components of the travel coordination system 130. In other embodiments, the method may include different and/or additional steps than those shown in FIG. 2. Additionally, steps of the method may be performed in different orders than the order described in conjunction with FIG. 2 in various embodiments.

The travel coordination system 130 receives 210 the location of an open provider. In some embodiments, the travel coordination system 130 receives the location from an application on a provider device 110. The travel coordination system 130 determines 220 the travel time from the provider's current location to the zone. In some embodiments, the travel time is determined by finding the fastest route to the zone and determining the travel time for that route. The travel time can be determined based on the rate of travel on the route to the zone, the current and future traffic conditions, and the distance to the zone. In some embodiments, the travel time is the time to arrive at the center of the zone. In other embodiments, the travel time is the time to arrive at the boundaries of the zone.

The travel coordination system determines 230 an estimate for the amount of time it would take for a provider in the zone to receive an assignment request. In some embodiments, the travel coordination system determines the estimate at the time when the provider would arrive at the zone. In some embodiments, the travel coordination system determines the estimate by directly computing the amount of time providers spend in the zone before receiving an assignment request. In some embodiments, the travel coordination system estimates the wait time based on the proportion of open providers who receive an assignment request within a period of time. In some embodiments, the travel coordination system generates a model of the estimate based on likely underlying provider supply and demand factors. For example, the supply factors could be the number of providers in the zone, the rate at which providers enter and leave the zone, and the rate at which providers are going online or offline. Example demand factors include the assignment rate and the historical demand in the zone.

The travel coordination system generates 240 a zone score for the zone based on the estimated wait time for a provider to receive an assignment request. In some embodiments, the zone score is also generated based on the provider's behavior. For example, the travel coordination system may raise a zone score for a zone in which the provider tends to drive or based on how likely a provider is to travel to zones with high zone scores. In some embodiments, the travel coordination system adjusts zone scores to account for zone scores provided to other providers or to account for providers traveling to or from the zone, which may balance the supply of providers to a particular zone.

The travel coordination system transmits 250 the zone score to the provider. In some embodiments, the zone score is presented on a road map that also displays the boundaries of the zone. A zone score may be determined for a plurality of zones visible on a user's map. In some embodiments, the zone score is represented without directly presenting the zone score, such as through a heat map of the zone scores.

Selecting a Route

Figure 3:
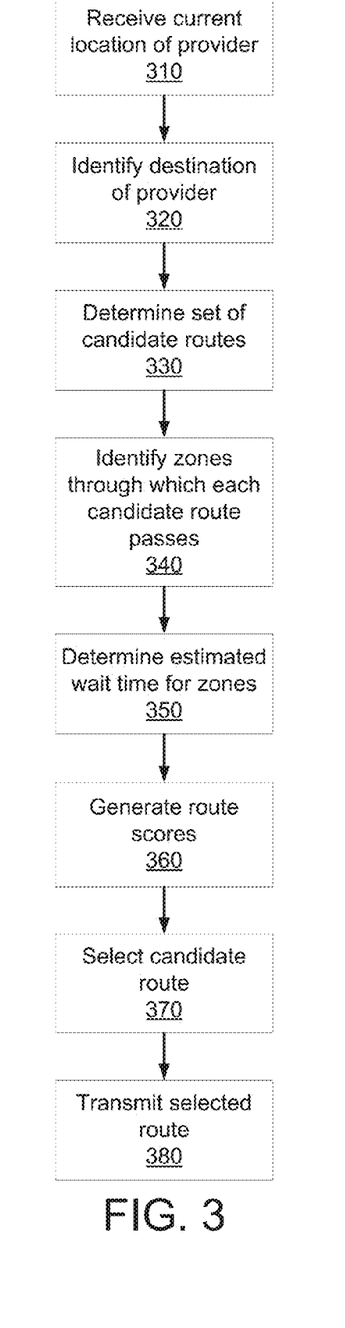
FIG. 3 is a flowchart for determining route scores and selecting a route to transmit to a provider, in accordance with some embodiments.

FIG. 3 is a flowchart for determining route scores and selecting a route to transmit to a provider, in accordance with some embodiments. This generation of a route score may be performed by the various components of the travel coordination system 130. In other embodiments, the method may include different and/or additional steps than those shown in FIG. 3. Additionally, steps of the method may be performed in different orders than the order described in conjunction with FIG. 3 in various embodiments.

The travel coordination system 130 receives 310 the current location of an open provider. In some embodiments, the travel coordination system receives the current location from an application on a provider device 110. The travel coordination system identifies 320 the destination of the provider within a geographic region. In some embodiments, the destination is selected by the travel coordination system as a suggested destination to reduce a wait time of the provider for an assignment request. In some embodiments, the destination is selected by the provider.

The travel coordination system determines 330 a set of candidate routes from the current location of the provider to the destination. In some embodiments, candidate routes must have a travel time or travel distance less than a certain amount relative to the fastest candidate route. For each candidate route in the set of candidate routes, the travel coordination system identifies 340 zones through which the candidate route passes and determines 350 an estimated wait time in each zone before a provider in the zone receives an assignment request. In some embodiments, the estimated wait time is determined with respect to an arrival time at which the provider would arrive at the zone by traveling along the candidate route. In some embodiments, the estimated wait time is determined based on a provider supply model and a provider demand model configured to estimate the provider supply and demand in the zone, respectively.

The travel coordination system generates 360 route scores for each of the candidate routes in the set of candidate routes based on the estimated wait times of the zones through which the candidate route passes. In some embodiments, the route score is generated based on the amount of time the provider would be in each zone by traveling along the candidate route. In some embodiments, the route score is generated based on the travel time of the candidate route.

The travel coordination system selects 370 a route from the set of candidate routes based on the generated route scores. For example, the travel coordination system may select the candidate route with the highest score. The selected route is transmitted 380 to the provider. In some embodiments, the route is a suggestion for a provider driving a vehicle and is presented to the provider through an application on a personal computing device. In other embodiments, the selected route is provided as an instruction for a provider that is an autonomous vehicle to travel the selected route.

Collecting Zone Data

Figure 4:
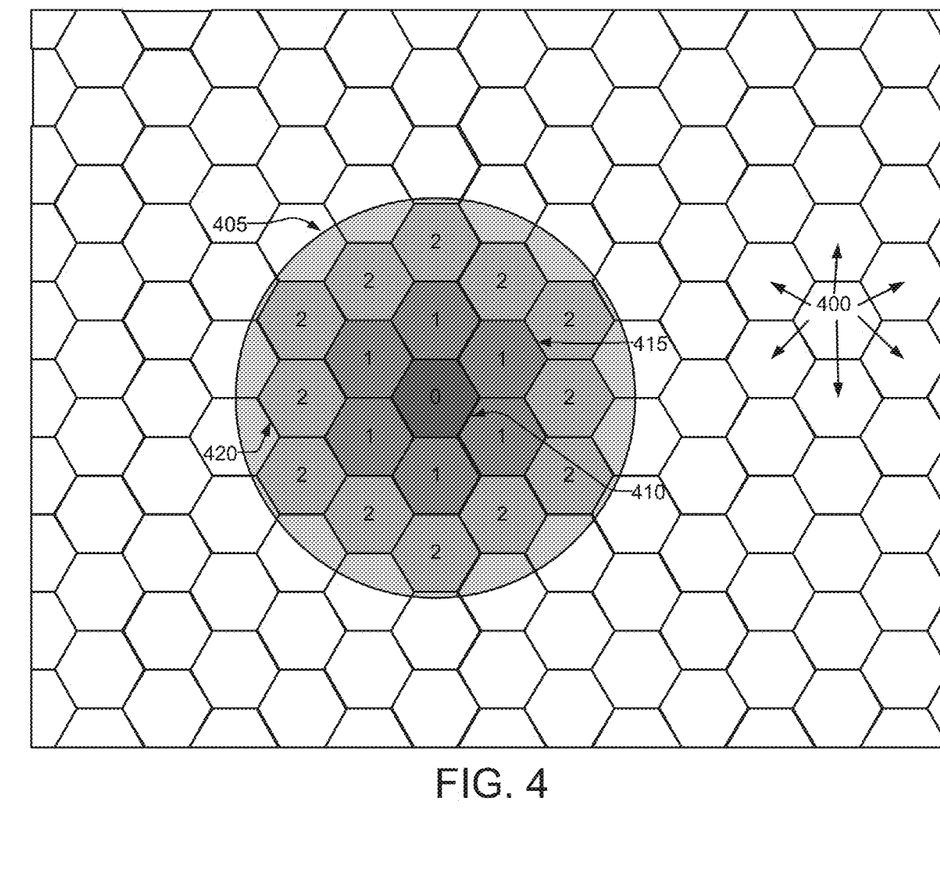
FIG. 4 illustrates determining data collection areas for a zone, in accordance with some embodiments.

FIG. 4 illustrates determining data collection areas for a zone, in accordance with some embodiments.

The travel coordination system uses zones 400 as the highest level of granularity for data collection. Zones 400 can be hexagonal (as presented in FIG. 4), rectangular, circular, or any other shape. Zones can be regular or irregular in both size and shape.

The travel coordination system aggregates data that it collects based on zones. For example, the travel coordination system may determine the number of riders that are operating the respective client applications (e.g., viewing information, but have not yet requested), the assignment rate for each zone, the number of providers in each zone, the traffic conditions in each zone, and/or the estimated time for a provider to receive an assignment request. In some embodiments, if zones are too small to contain sufficient data to make accurate determinations about the zone (e.g. assignment rate, traffic conditions, estimated time for an assignment request, etc.), then data from zones in a data collection area 405 surrounding the zone may be used to supplement the data in the zone. For example, to determine the assignment rate for a zone 410, the travel coordination system may determine the assignment rate for data collection area 405 and use the value for zones within the data collection area 405 for the zone 410. In some embodiments, the area surrounding the zone 405 is determined using k-rings of zones. For example, ring 415 constitutes a 1-ring around zone 410 and ring 420 constitutes a 2-ring around zone 410. In some embodiments, the radius of the k-ring based on the amount of data in the area. For example, more-urban areas tend to have a higher data density, so a lower k-ring radius may be used. Similarly, more-rural areas tend to have lower data density, so a higher k-ring radius may be used. In some embodiments, the data collection areas for different zones can overlap. As an alternative, rather than adjusting the k-ring radius, the size of the zones may increase or decrease according to the density of requests within a zone.

Determining the Estimated Time for Assignment Request

Figure 5:
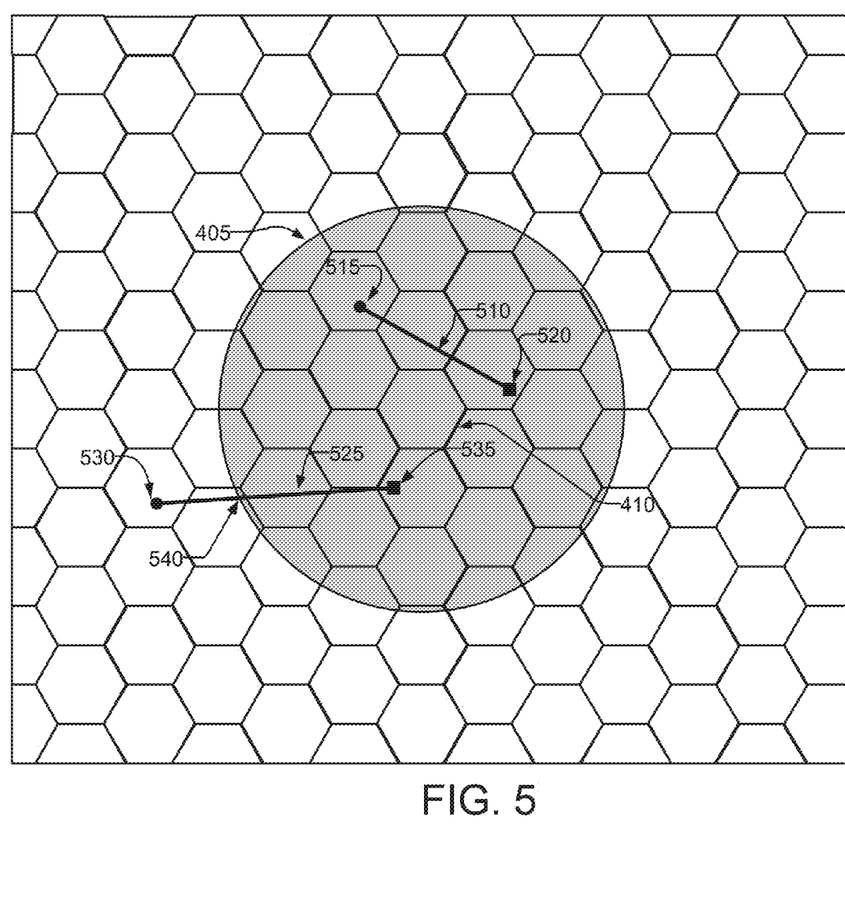
FIG. 5 illustrates determining an estimated wait time for an assignment request in a zone, in accordance with some embodiments.

FIG. 5 illustrates determining an estimated wait time for an assignment request in a zone, in accordance with some embodiments.

The travel coordination system can directly determine the estimated time for a provider to receive an assignment request in a zone. This can be done by determining, for each provider, the amount of time spent in the zone without a rider before receiving an assignment request. The travel coordination system can determine statistical information about the wait times of the providers in the zone, such as the average weight time, the standard deviation, or statistical models that model the wait times in the zone.

In some embodiments, the travel coordination system only considers the wait times of providers who become open in the zone or data collection area, and who also received an assignment request within the same zone, or within the data collection area for the zone. For example, in FIG. 5, area 405 is the data-collection area for zone 410. A first provider was available along route 510. This first provider dropped off their last rider at location 515 and received an assignment request at location 520. The travel coordination system in this example uses the wait time of the first provider for zone 410 because both locations 515 and 520 are within area 405. However, a second provider is was available along route 525: becoming open at 530 and receiving an assignment request at 535. In this example, the wait time of the second provider would not be used for zone 410 because the second provider became open at 530, which is outside the data-collection zone, as this provider did not become available within the data collection area 405, despite receiving a request within this data collection area 405.

In some embodiments, rather than disregarding providers who became open outside a data-collection area, the travel coordination system only considers the wait time of the provider while the provider is in the data-collection area 405. For example, the second provider traveled along route 525, became open at 530, and received an assignment request at 535. The travel coordination system in this example uses the wait time of the provider from where the provider entered the data-collection area (location 540) to where the provider received the assignment request (location 535).

Presenting Zone Scores and Routes to Providers

Figure 6:
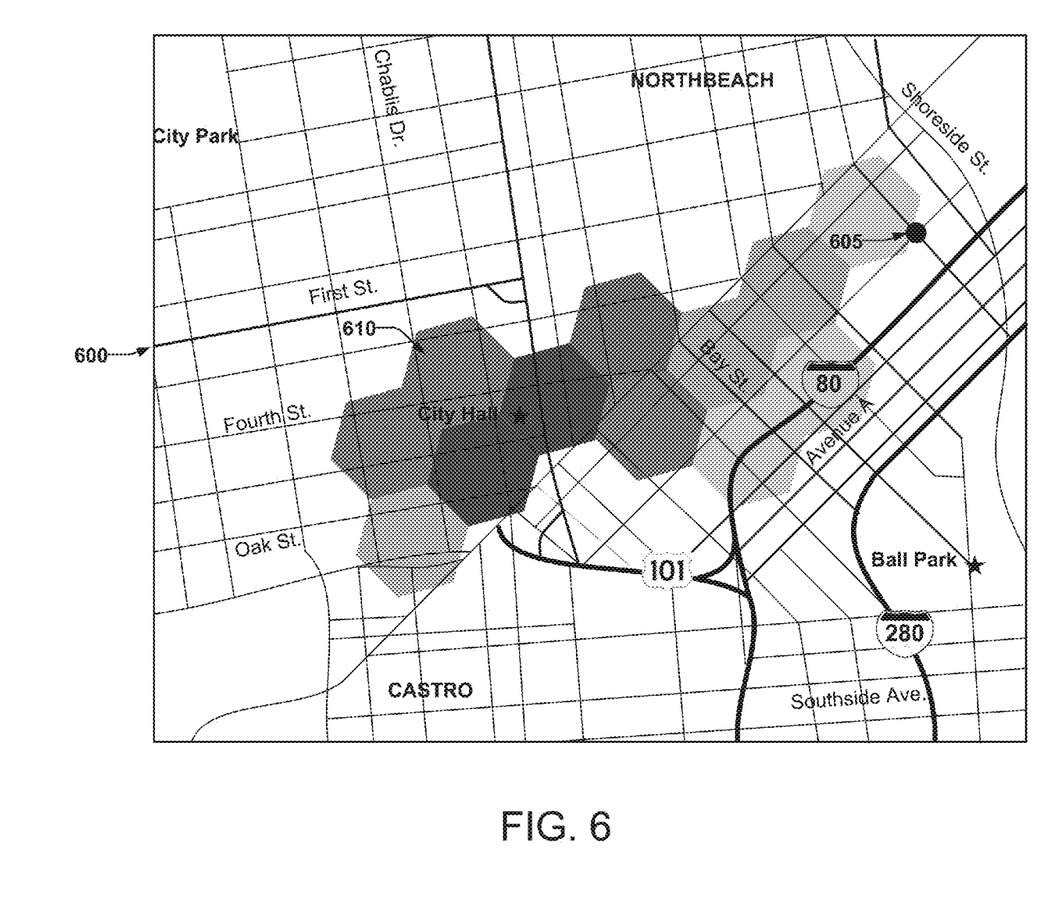
FIG. 6 illustrates an example display for zone scores, in accordance with some embodiments.

FIG. 6 illustrates an example display for zone scores, in accordance with some embodiments. A road map 600 is presented to the provider along with a provider's current position 605. In the embodiment illustrated by FIG. 6, the zone scores are represented using a heat map 610, where a darker tint represents a higher zone score. In some embodiments, each shade of tint represents a range of zone scores. In some embodiments, different colors and/or color saturations are used to represent the zone scores. In some embodiments, zones must surpass a threshold for the zone score in order to be tinted. Numerical values representing the zone scores may be presented as well. The display of zone scores on the heat map 610 allows a provider to determine quickly and at a glance which zones may be more likely to generate an assignment request for the provider.

Figure 7:
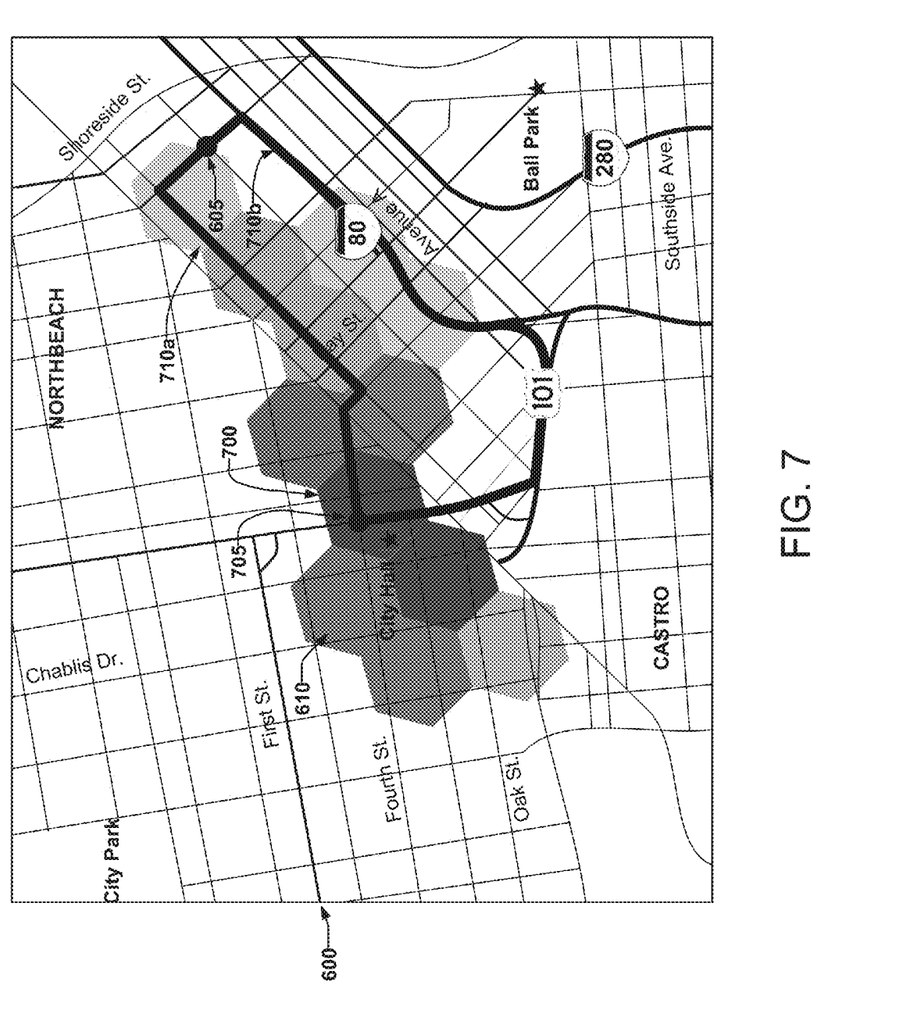
FIG. 7 illustrates an example display with route suggestions for a provider, in accordance with some embodiments.

FIG. 7 illustrates an example display with route suggestions for a provider. In this example, the travel coordination system generated two candidate routes from the provider's current position 605 to a destination 705 within a zone 700: route 710a and 710b.

The comparison of route scores for routes 710a and 710b reflects whether or not it is preferable to delay arriving at the destination 705, which has a high zone score, to be more likely to receive an assignment request along another route. Route 710a travels through zones with higher zone scores than route 710b and, since route 710a takes surface streets, spends more time in each zone. Therefore, it is more likely a provider will receive an assignment request while on route to the destination 705 by taking route 710a than route 710b. The travel coordination system might, as a result, score route 710a more highly than route 710b. However, route 710b has a shorter travel time, since the provider takes highways to arrive at the destination 705 when traveling along route 710b. Also, zone 700 has a higher zone score than the zones through which route 710a passes and, since route 710b has a shorter travel time, the provider can spend more time in zone 700 by taking route 710b over route 710a. Therefore, the travel coordination system may score route 710b more highly than route 710a if the score of zone 700 is sufficiently high relative to the zones along which route 710a travels. Thus, the final route scores for routes 710a and 710b may be dependent on the zone scone of zone 700, the specific zone scores of the zones through which the routes pass, and the specific travel times of each route.

SUMMARY

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
receiving, at a travel coordination system from a provider device, a current location of a provider that is available to transport a rider, the provider operating the provider device in communication with the travel coordination system;
identifying, by the travel coordination system, a destination for the provider;
determining, by the travel coordination system, a set of candidate routes from the current location of the provider to the destination;
generating, by the travel coordination system for each candidate route in the set of candidate routes, a route score, wherein generating a route score for a candidate route comprises:
identifying a set of zones through which the candidate route passes,
determining an estimated wait time at an arrival time at each zone in the set of zones for the provider by traveling along the candidate route, an estimated wait time for a zone being an estimated amount of time the provider is expected to wait in the zone before receiving an assignment request to transport a rider in the zone, and
generating a route score for the candidate route based on the estimated wait times for the set of zones;
selecting, by the travel coordination system, a route from the set of candidate routes based on a route score corresponding to the selected route; and
transmitting, by the travel coordination system, data of the selected route to the provider device.

2. The method of claim 1, wherein the destination is selected by the travel coordination system as a suggested destination to reduce a wait time of the provider for an assignment request.

3. The method of claim 1, wherein the destination is selected by the provider.

4. The method of claim 1, wherein a route score for a candidate route is based on an arrival time to the destination by traveling along the candidate route.

5. The method of claim 1, wherein generating a route score for a candidate route further comprises:
determining, by the travel coordination system, a first arrival time for the provider at the destination by traveling along the candidate route;
determining, by the travel coordination system, a second arrival time for the provider at the destination by traveling along a second candidate route in the set of candidate routes;
estimating, by the travel coordination system, for a destination zone containing the destination, a wait time for the provider in the destination zone at the first arrival time; and
generating, by the travel coordination system, a route score the candidate route based on (1) a difference between the first arrival time and the second arrival time, and (2) the estimated wait time.

6. The method of claim 1, wherein the estimated wait time for a zone is determined based on a provider supply model and a provider demand model for the zone, the provider supply model estimating a quantity of providers in the zone that are available to transport a rider, and the provider demand model estimating a quantity of riders in the zone.

7. The method of claim 1, wherein the route score is generated based on amounts of time the provider would spend in the zones through which the candidate route passes by traveling along the candidate route.

8. The method of claim 7, wherein a weighted average of zone scores of the zones through which the candidate route passes is used to generate the route score.

9. The method of claim 7, wherein an integral of zone scores of the zones through which the candidate route passes is used to generate the route score.

10. The method of claim 1, further comprising:
causing, by the travel coordination system, the provider device to display a user interface of the selected route as a suggestion to reduce a wait time to receiving an assignment request.

11. The method of claim 1, wherein the provider is an autonomous vehicle, and further comprises:
transmitting instructions to the provider device instructing the provider to travel along the selected route.

12. A non-transitory computer-readable storage medium storing computer program instructions to perform steps comprising:
receiving, at a travel coordination system from a provider device, a current location of a provider that is available to transport a rider, the provider operating the provider device in communication with the travel coordination system;
identifying, by the travel coordination system, a destination for the provider;
determining, by the travel coordination system, a set of candidate routes from the current location of the provider to the destination;
generating, by the travel coordination system for each candidate route in the set of candidate routes, a route score, wherein generating a route score for a candidate route comprises:
identifying a set of zones through which the candidate route passes,
determining an estimated wait time at an arrival time at each zone in the set of zones for the provider by traveling along the candidate route, an estimated wait time for a zone being an estimated amount of time the provider is expected to wait in the zone before receiving an assignment request to transport a rider in the zone, and
generating a route score for the candidate route based on the estimated wait times for the set of zones;
selecting, by the travel coordination system, a route from the set of candidate routes based on a route score corresponding to the selected route; and
transmitting, by the travel coordination system, data of the selected route to the provider device.

13. The computer-readable storage medium of claim 12, wherein the destination is selected by the travel coordination system as a suggested destination to reduce a wait time of the provider for an assignment request.

14. The computer-readable storage medium of claim 12, wherein the destination is selected by the provider.

15. The computer-readable storage medium of claim 12, wherein a route score for a candidate route is based on an arrival time to the destination by traveling along the candidate route.

16. The computer-readable storage medium of claim 12, wherein
generating, by the travel coordination system, a route score for a candidate route further comprises:
determining, by the travel coordination system, a first arrival time for the provider at the destination by traveling along the candidate route;

determining, by the travel coordination system, a second arrival time for the provider at the destination by traveling along a second candidate route in the set of candidate routes;

estimating, by the travel coordination system for a zone containing the destination, a wait time for the provider in the zone containing the destination at first arrival time;

generating, by the travel coordination system, a route score the candidate route based on (1) a difference between the first arrival time and the second arrival time, and (2) the estimated wait time.

17. The computer-readable storage medium of claim 12, wherein the estimated wait time for a zone is determined based on a provider supply model and a provider demand model for the zone, the provider supply model estimating a quantity of providers in the zone that are available to transport a rider, and the provider demand model estimating a quantity of riders in the zone.

18. The computer-readable storage medium of claim 12, wherein the route score is generated based on amounts of time the provider would spend in the zones through which the candidate route passes by traveling along the candidate route.

19. The computer-readable storage medium of claim 12, wherein further comprising:

causing, by the travel coordination system, the provider device to display a user interface of the selected route as a suggestion to reduce a wait time to receiving an assignment request.

20. The computer-readable storage medium of claim 12, the provider is an autonomous vehicle, and further comprises:

instructing the provider to travel along the selected route.

* * * * *

UNITED STATES PATENT AND TRADEMARK OFFICE
CERTIFICATE OF CORRECTION

PATENT NO. : 9,778,057 B2
APPLICATION NO. : 15/018042
DATED : October 3, 2017
INVENTOR(S) : Eoin O'Mahony et al.

Page 1 of 1

It is certified that error appears in the above-identified patent and that said Letters Patent is hereby corrected as shown below:

In the Claims

Claim 5, Column 15, Line 57: "score the candidate" should read as --score for the candidate--

Claim 16, Column 17, Line 10: "score the candidate" should read as --score for the candidate--

Signed and Sealed this
Twenty-seventh Day of March, 2018

Andrei Iancu
*Director of the United States Patent and Trademark Office*